(12) United States Patent
Gschwind (10) Patent No.: US 7,537,740 B2
(45) Date of Patent: May 26, 2009

(54) HEATING DEVICE AND THERMAL REACTOR FOR THE HEATING AND GASIFICATION OF UREA

(75) Inventor: Thomas Gschwind, Bad Dürkheim (DE)

(73) Assignee: DBK David + Baader GmbH, Kandel/Pfalz (DE)

( * ) Notice: Subject to any disclaimer, the term of this patent is extended or adjusted under 35 U.S.C. 154(b) by 504 days.

(21) Appl. No.: 11/406,124

(22) Filed: Apr. 18, 2006

(65) Prior Publication Data

US 2007/0003458 A1    Jan. 4, 2007

(30) Foreign Application Priority Data

Apr. 18, 2005    (EP) .................................. 05008388

(51) Int. Cl.
*B01J 19/00* (2006.01)
*F28F 27/00* (2006.01)
*F01N 3/10* (2006.01)

(52) U.S. Cl. .................. 422/198; 422/232; 422/169; 422/171; 165/200; 165/275; 165/51; 60/282; 60/286; 60/289; 60/297; 60/303; 60/304

(58) Field of Classification Search ................ 422/198, 422/206, 208, 232, 169, 171; 165/200, 201, 165/205, 253, 268, 275, 287, 288, 48.1, 51, 165/53, 54, 55, 56, 61, 65, 66; 60/272, 273, 60/274, 282, 286, 289, 297, 299, 303, 304
See application file for complete search history.

(56) References Cited

U.S. PATENT DOCUMENTS 5,820,838 A * 10/1998 Tsuo et al. ................. 423/235
6,361,754 B1    3/2002 Peter-Hoblyn et al.
6,638,487 B2 * 10/2003 Wakasa et al. .............. 423/235

(Continued)

FOREIGN PATENT DOCUMENTS

DE        4038054        6/1992

(Continued)

OTHER PUBLICATIONS

European Search Report for European Application No. EP05008388 issued on Sep. 22, 2006.

(Continued)

*Primary Examiner*—Walter D Griffin
*Assistant Examiner*—Huy-Tram Nguyen
(74) *Attorney, Agent, or Firm*—Michael Best & Friedrich LLP (57) ABSTRACT

Heating device for the heating and gasification of urea or an urea solution, particularly for internal combustion engines, wherein said heating device is designed for installation in a gas line extending in a direction of flow and wherein said heating device has at least two gas-permeable heating surfaces that are spaced apart from each other in the direction of flow and that define a heating chamber. In order to create an improved heating device for stable urea gasification in an exhaust gas line that guarantees a uniform temperature distribution in the heating room as well as a quick response time, according to the invention an inlet opening is provided that discharges into the heating chamber between the at least two heating surfaces and through which the urea or urea solutions can be fed into the heating chamber.

20 Claims, 6 Drawing Sheets

U.S. PATENT DOCUMENTS

| | | | |
|---|---|---|---|
| 2001/0018033 A1* | 8/2001 | Wakasa et al. | 422/172 |
| 2003/0070424 A1 | 4/2003 | Verdegan et al. | |
| 2005/0152822 A1* | 7/2005 | Wakasa et al. | 423/235 |
| 2006/0101811 A1* | 5/2006 | Linna et al. | 60/286 |

FOREIGN PATENT DOCUMENTS

| | | |
|---|---|---|
| DE | 4203807 | 8/1993 |
| DE | 10206028 | 8/2003 |
| EP | 1481719 | 12/2004 |

OTHER PUBLICATIONS

Müller, W. et al., "Festharnstoff-SCR in: "3. Internationales Forum Abgas- und Partikelemissionen - Beitrag," AVL Deutschland GmbH, Sep. 14-15, 2004, Seiten 1-5, 224-236 (Handout on Sep. 14, 2004 to conference attendees).

Affidavit (Eidesstattliche Versicherung) of Professor Dr. Werner Müller dated Oct. 17, 2008 and slides of the presentation that took place on Sep. 14-15, 2004 (13 pages).

* cited by examiner

HEATING DEVICE AND THERMAL REACTOR FOR THE HEATING AND GASIFICATION OF UREA

This application claims priority from European Patent Application No. 05008388.0, filed Apr. 18, 2005, the entire contents of which are incorporated herein by reference.

The invention relates to a heating device for the heating and gasification of urea or a urea solution, particularly for internal combustion engines, wherein said heating device is designed for installation in a gas line extending in a direction of flow and wherein said heating device has at least two gas-permeable heating surfaces that are spaced apart from each other in the direction of flow and that define a heating chamber.

The invention additionally relates to a thermal reactor for the heating and gasification of urea or a urea solution, particularly for internal combustion engines, wherein said thermal reactor comprises a heating device, an intake opening and an exhaust opening, wherein the intake and exhaust openings are connected to one other by means of a gas line and a gasification area is arranged in the gas line.

Furthermore, the invention relates to a method for heating and gasifying urea or a urea solution, particularly for internal combustion engines, wherein a gas flow flows through the gas line in a direction of flow, and wherein solid urea or a urea solution is fed into the gas flow and the solid urea or urea solution is heated and vaporized, and removed with the gas flow.

Thermal reactors and heating devices of that kind are used in order to clean the exhaust gases of internal combustion engines, such as, for example, nitrogen oxides of diesel engines. The cleaning takes place according to the so-called SCR (selective catalytic reduction) method. In the SCR method, the nitrogen oxides are chemically converted into nitrogen and water in a catalyst, with involvement of a suitable reducing agent. Vaporous or gaseous ammonia is often used as the reducing agent, wherein this ammonia is generated from urea or a urea solution by vaporization, subsequent thermolysis and hydrolysis. The generated ammonia is fed into the exhaust gas flow.

A heating device for the vaporization and thermolysis of a urea solution is described in DE 40 38 054 A 1, for example. The heating device vaporizer consists of a metal honeycomb body that is divided into three pieces, wherein it is possible to heat said honeycomb body indirectly using the hot exhaust gases or directly electrically. Said honeycomb body is arranged in the exhaust gas line upstream of the actual SCR catalyst. The urea solution is introduced into the exhaust gas flow via a fluid line with a nozzle, which discharges into the exhaust gas line upstream of the vaporizer. The urea solution is sprayed onto the vaporizer in the direction of flow of the exhaust gas by means of the nozzle. Detrimental in the device of DE 40 38 054 A 1 is the large space requirement of the vaporizer and the uneven mixing of the sprayed urea solution.

The problem of the uneven distribution is solved in DE 42 0a:-807 A 1, an improvement of DE 40 38 054 A 1, by use of a multiple-piece vaporizer downstream of the nozzle that discharges into the gas line. The individual vaporizer sections have slits that deflect the exhaust gas flow radially to the direction of flow and stir it. In the case of the vaporizer of this publication, multiple vaporizer sections are arranged one after another in such a way that there is a gap between the vaporizer sections. This gap represents a mixing area in which the radial flow generated in the vaporizer sections is intensified.

Detrimental in aqueous urea solutions is that these demand a higher weight and larger volume in comparison to dry solid urea. Furthermore, urea solutions freeze at low temperatures of less than −12° C., so that the storage containers and transport and dosing systems must be heated at low temperatures. A further disadvantage of urea solutions is that additional energy must be applied for vaporization of the solvent water.

In place of the aqueous urea solution, DE 102 06 028 A 1, for example, proposes the use of dry urea as the starting substance of the reducing agent in the SCR method. The dry urea can be dosed from a storage container as a granulate material, powder or pill and fed to the thermal reactor with compressed air. The reactor serves to generate ammonia and comprises a heated chamber with a thermolysis zone and a hydrolysis zone. An electric heating device, which vaporizes and pyrolyses the solid urea, is arranged in the thermolysis zone. Detrimental in the thermolysis zone of DE 102 06 028 A 1 is that the gasification of the solid urea takes place at an uneven temperature distribution in a reaction chamber with only one heated metal surface. Furthermore, the ammonia produced in the case of this device must yet be introduced into the exhaust gas flow via a separate gas line. Consequently, it is not possible to integrate the reactor of DE 102 06 028 A 1 directly into the gas line.

The invention therefore takes as its object to enhance heating devices, thermal reactors and methods for the heating and gasification of solid urea or urea solutions and to achieve a stable gasification of the urea in the exhaust gas line, based on a fast reaction time of the heating chamber and a uniform temperature distribution in the heating chamber, even just shortly after the heating device has been switched on.

According to the invention, this object is solved for the heating device mentioned at the beginning by means of an inlet opening that discharges into the heating chamber between the at least two heating surfaces, and through which the urea or urea solution can be fed into the heating chamber.

For the thermal reactor, this object is solved according to the invention in that the heating device comprises a heating chamber arranged in the gasification area, wherein this heating chamber is defined on the intake and exhaust sides by heating surfaces through which gas can pass, and the heating device further comprises an inlet opening for the urea or urea solution between the heating surfaces.

For the method described at the beginning, this object is solved by feeding the urea or urea solution into the gas line between two heating surfaces.

These surprisingly simple solutions have the advantage that the heating chamber is heated at least from the two sides on which the heating surfaces are arranged, and the gasification temperature needed to thermolyse solid urea or a urea solution is therefore already reached shortly after the heating device has been switched on. Meant as a heating surface here is a flat body that emits heat to the gaseous substance or the urea or urea solution. Furthermore, the multiple-sided heating of the heating chamber, which represents the space lying between the at least two heating surfaces in the gas chamber, ensures uniform temperature control in the chamber. The simple design of the heating device allows gas lines, for example, exhaust gas lines from internal combustion engines, to be retrofitted with the heating device according to the invention, or the integration of a reactor according to the invention into the conduit at a later time.

Heating devices, thermal reactors and methods improved in such a way can be further developed by various, mutually independent embodiments, each of which is advantageous in itself. These embodiments and the advantages connected to each of these embodiments will be briefly discussed in the following.

For example, in one advantageous embodiments of the heating device according to the invention, the heating surfaces can extend in a plane essentially running perpendicular to the direction of flow. This offers the advantage of an especially space-saving apparatus. The height of the heating chamber corresponds to the distance between the two heating surfaces, and can be optimized for the particular requirements of the various urea forms, such as solution, granulate material, powder or pellets. In this way, the height of the heating chamber can be adapted to the diameter of dry urea pellets, for example.

In order to avoid the known problems with urea solutions, it is advantageous for the method to gasify solid urea or a solid urea solution. In the case of solid urea, gasification of the solid urea or solid urea solution in the form of pellets particularly lends itself.

In the case of the method according to the invention, it is furthermore possible to introduce the urea or the urea solution into the gas line essentially orthogonally to the direction of flow between the heating surfaces of the heating chamber. In this connection it is advantageous that complicated and expensive lines, which are still needed in the devices in DE 40 38 054 A 1 or DE 40 03 807 A 1 in order to introduce the urea parallel to the flow of gas, become unnecessary.

Furthermore, in an advantageous further development, the heating device can comprise at least two heating elements, wherein each of the heating surfaces is allocated to a separate heating element. The heating surface for heat emission and the heating element that generates the heat are parts of a heating unit, which can furthermore comprise a support element or a means of attachment for the heating surface and electrical contact elements. This embodiment is advantageous because each of the two heating surfaces can be heated independently of the other by the heating elements of the separate heating units. The flow of the gaseous substance, which first passes the heating surface on the influx or intake side and is heated by said heating surface, cools the heating surface on the influx side more strongly than it cools the heating surface on the outflow or exhaust side, through which air that has already been heated passes. This embodiment now makes it possible to control the two heating surfaces independently of one another and to guarantee a uniform temperature distribution in the heating chamber.

In particular, it is advantageous to pyrolyse the urea at a temperature of at least 400° C., so that no damaging deposits of the solid urea or the urea solution deposit on the heating surfaces.

Alternatively, the two heating surfaces can also be allocated to a single heating element, whereby the necessity of a second heating element, together with its contact point, can be omitted. In this embodiment, as well, the two heating surfaces can generate different heating capacities, for example, by means of the arrangement of the heating element or by having the heat-emitting surfaces of the two heating walls vary.

Gas-permeable heating surfaces can be manufactured in a particularly simple manner by forming at least one of the heating surfaces, at least in sections, from a heating spiral. Alternatively, a heating net, heating grid or a heating meander can also be used. The advantage of a heating spiral is that the clearance of the openings through which the gas permeates can very easily be adjusted to the desired values by the winding of the spiral.

It has proven to be particularly advantageous if a heating spiral comprises a rolled-up heating band or a rolled-up tubular heating element. According to this embodiment, a particularly large heating surface is available for effective heat transfer from the heating element to the exhaust gas flow or to the urea. Furthermore, in this case the heating spiral is simultaneously heating surface and heating element, so that less components are required.

A further advantage of a heating spiral that comprises a rolled-up heating band or a rolled-up tubular heating element is that, in addition to flat, two-dimensional coils, screws or helical three-dimensional spatial structures can also be formed. Consequently it is possible, according to a further embodiment, to form two flat heating spirals, at a distance from each other in the direction of flow, from a single tubular heating element or heating band, with said heating spirals being connected via a screw-like section. In this way, a heating chamber that can be heated on all sides is created, because the casing surface area of the chamber can be heated by the screw-shaped section of the heating band from the radial direction.

A further possibility for heating the heating chamber from the radial direction is then given according to a further embodiment if a heat sink is provided that surrounds the heating chamber in the form of a casing and that is in a heat-transfer connection with at least one heating element. Furthermore, at least one heating surface can be formed from a heat sink, so that the heat sink is in a heat-transfer connection with at least one heating element. It is particularly advantageous if the heat sink, in one piece, forms at least one heating surface and a section of the casing of the heating chamber. In this way, the heat sink heats both one heating surface and the casing of the heating chamber.

If solid urea is used in the form of a granulate material or pellets, the heating surfaces can have gas permeation openings with a clearance that is smaller than the clearance of the inlet opening. According to this advantageous embodiment, the urea or urea solution is essentially vaporized between the two heating surfaces, because the introduced urea has larger geometrical dimensions than the gas-passage openings of the heating surfaces. In this way, the heating surfaces form a heat sieve, by means of which the urea is held back and heated in the heating chamber, and only the vaporized urea or the gaseous pyrolyzation products ammonia and isocyanic acid, resulting from the vaporization, are transported out of the heating chamber with the flow of the gaseous substance.

In order to define the clearance of the openings through which the gas flows and also hold it constant during the operation of the heating device, at least one of the heating surfaces can consist of a multiple number of adjacent heating sections, which are spaced at a distance from one another by spacers and that way form the gas-flow openings. For example, if one uses heating surfaces that are bent back on themselves, such as heating spirals or heating meanders, it is possible to attach the spacers in the openings between adjacent surfaces of the heating element facing each other. In this case, the spacers determine not only the clearance of the openings for the flow, but also additionally assure that adjacent regions of the heating surfaces do not touch and trigger a short-circuit in heating surfaces through which current is flowing. Therefore, it is advantageous to use spacers made from an insulating material.

In a further advantageous embodiment, bulged areas of profiles are formed in the heating surface as spacers. As a result of the low potential difference between adjacent sections of the heating surfaces, e.g., individual loops of a heating spiral, no voltage flashover results, so that the use of insulating spacers is not necessary. If bulging areas are stamped into the heating surface, for example, in the form of corrugations, the attachment of spacers is no longer necessary. Furthermore, profiles lead to an increased heating surface and greater stability.

In order to improve the gasification of the urea, according to a further advantageous embodiment the heating surfaces form flow elements, by means of which the flow through the heating chamber can be swirled during operation. The swirling provides better mixing of the exhaust air or the outgassing components of the urea and improves the heat transfer from the heating surfaces to the flow of gas and the urea. For example, the heating bands of a heating spiral or heating meander formed as a heating surface, or bore holes of a heating sheet serving as openings through which the gas passes can lie tilted to the direction of the flow, instead of parallel to the direction of the gas flow. As a result, the flow of gas is deflected and swirled at the heating surfaces.

If insulating spacers or stampings in the heating surfaces forming spacers are used, these spacers can likewise be arranged tilted to the direction of flow as flow elements. In this case, the flow of gas is deflected and swirled, instead of at the heating surfaces, at the spacers placed inclined to the direction of flow. The deflection direction can be influenced in a particularly simple manner by the shape and alignment of the spacers.

The thermal reactor for gasification of solid urea or a urea solution can also be advantageously further developed in that a heating device according to the abovementioned embodiments is used.

It is particularly advantageous if the gas line has a feed opening in the gasification area, whereby said feed opening discharges in the area of the heating chamber and particularly in the area of the inlet opening of the heating chamber. In this way, the feed opening of the gas line and the inlet opening of the heating chamber are in alignment in an entrance direction for the urea, so that the urea can be transported into the interior of the heating chamber through the gas line, meaning the reactor wall and the inlet opening of the heating device, in a very simple way.

In a further embodiment of the thermal reactor, the heating device can at least partially form the gas line of the thermal reactor. Because in this case the heating device already forms the wall of the reactor that conducts the gaseous substance, the manufacture and installation of this embodiment are particularly advantageous.

In the following, the invention is explained by way of example, with reference to the accompanying drawings. The various features can be combined independently of one another, as was already explained above, in the individual advantageous embodiments.

Shown are.

Figure 1:
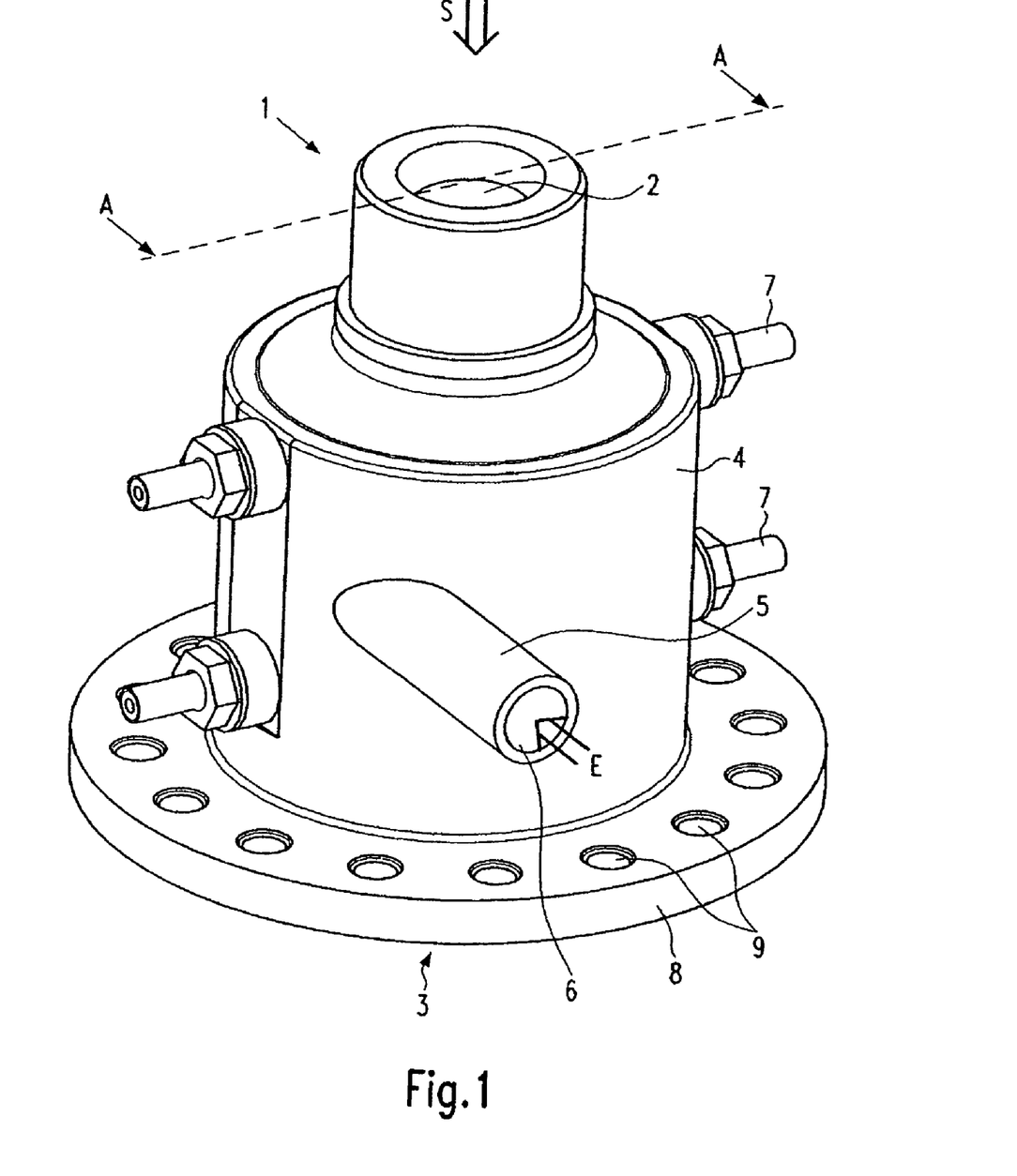
FIG. 1 a schematic top view of a thermal reactor according to the invention.

First the general design of a thermal reactor 1 according to the invention is shown, with reference to FIG. 1.

The reactor 1 according to the invention comprises an intake opening 2 and an exhaust opening 3, which are connected to one another via a gas line 4. The gas line 4 represents the reactor wall, and can be connected to an exhaust gas line (not depicted) in the area of the intake opening 2, for example, to the exhaust gas line of an internal combustion engine. The exhaust gases consequently flow in a direction of flow S through the intake opening 2 and into the pyrolysis reactor 1.

The outer diameter of the reactor casing 4 changes in the direction of flow from the intake opening 2 to the exhaust opening 3. In a first influx area, which immediately follows the intake opening 2, the diameter is smaller than in the subsequent second gasification area and third exhaust area. The gas line 4 has a conical widening in the first influx area, before the second gasification area.

The gasification area has a constant diameter. In this zone, for pyrolyzation of the urea, a connection piece 5 for a urea feed line (not shown) is formed. The connection piece 5 protrudes from the gasification area of the gas line 4 perpendicularly to the direction of flow S in the radial direction in the manner of a pipe. The connection piece comprises a central feed opening 6, which discharges in the gas line 4 and through which the urea can be introduced and fed into the gasification area of the reactor 1 along an influx or entrance direction E. On the interior wall of the gas line 4, the feed opening 6 discharges in a heating chamber 11 (not to be seen in FIG. 1), which lies in the gasification area, defined on the inflow and outflow sides by heating surfaces 10 ft. through which the gas can flow (not to be seen in FIG. 1).

This arrangement can be seen from FIG. 1, in that the feed opening 6 of the connection piece 5 protrudes out of the gas line 4 between the contact points 7 of two separate heating units of the heating device of the thermal reactor 1.

In the third exhaust area, the reactor chamber 4 finally; has a circumferential attachment flange 8. The circumferential flange 8 is provided with mounting openings 9 at regular intervals, said mounting openings 9 being manufactured into the flange 8 parallel to the direction of flow 5. Consequently, it is particularly easy to couple the thermal reactor 1 in this embodiment to a catalyst housing or a gas line via the attachment flange 8.

Figure 2:
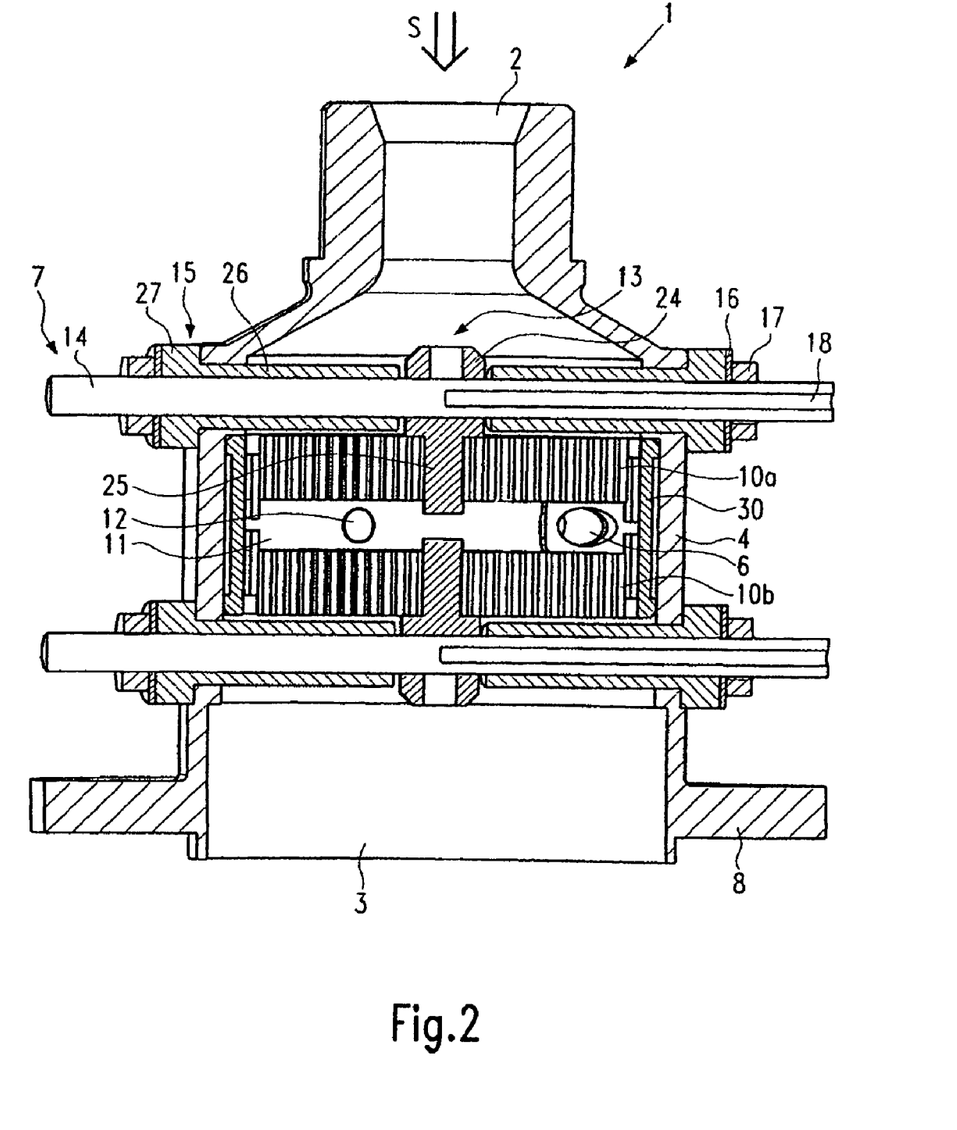
FIG. 2 the embodiment of the thermal reactor from FIG. 1 in a sectional view along the line A-A.

FIG. 2 shows a sectional view of the reactor 1 from FIG. 1 along the line A-A and illustrates both the arrangement and the electric contacting and insulation of the heating surfaces 10a and 10b that form the heating chamber 11 in the gas line 4. In FIG. 2, the same reference numbers are used as in FIG. 1 for elements whose design and/or function is identical or similar to elements in FIG. 1.

FIG. 2 illustrates the manner in which the gas line 4 in the first influx area, which extends in the direction of flow 5 from the intake opening 2 to the heating surface 10a on the inflow side, expands to the second thermolysis area in a diffuser-like manner. This construction has the advantage that the flow speed of the exhaust gas is reduced and the inner gas pressure is increased.

In the second gasification area of the gas line 4, two heating surfaces 10a and 10b, at a distance from each other, are arranged in the direction of flow 5, where said heating surfaces 10a and 10b define a heating chamber 11 between them. The outlet of the feed opening 6 is arranged in the area of the heating chamber 11, so that a urea pellet 12 can be fed into the heating chamber 11 of the reactor 1 in an influx direction E perpendicular to the direction of flow S of the gaseous substance. In the heating chamber 11 the pellet 12 can be heated and vaporized. The third exhaust area finally extends from the outflow-side heating surface 10b to the exhaust opening 3 in the direction of flow S.

The heating surfaces 10*a* and 10*b* extend in a plane running essentially perpendicular to the direction of flow 5, wherein each of the heating surfaces 10*a*, 10*b* represents the heating element of a separate heating unit. Consequently, the heat that is emitted via the heating surfaces 10*a*, 10*b* can be controlled independently of the other heating surface 10*a*, 10*b*.

The heating surfaces 10*a*, 10*b* according to the embodiment of FIG. 2 are formed from spiral-shaped heating bands, so that the heating spirals are simultaneously heating surface 10*a*, 10*b* and heating element 10 of the heating unit 10, 13, 14. Here the distance between the spiral coils roughly corresponds to the thickness of the heating bands. For example, bands of heat conductor alloys with a thickness of from 0.4 to 0.8 mm and a width of from 4 to 10 mm can be used, and rolled up into a heating spiral with a diameter of approximately 30 mm.

The distance between the spiral coils that bend back on themselves as sections of the heating surface 10*a* and 10*b* corresponds to the gas-permeation opening 23 (not shown in FIG. 2) in the heating surface 10. Because the clearance of the gas-permeation opening 23 is smaller than the clearance of the feed opening 6 in the reactor casing 4, the gas-permeation openings 23 are considerably smaller than the urea pellet 12. Therefore, the pellet 12 remains in the heating chamber 11 and is heated, vaporized and pyrolysed there. Because the larger portion of the heating chamber 11 is defined by the heating surfaces 10, an especially uniform temperature distribution can be accomplished within the heating chamber 11, so that rapid vaporization of the pellet 12, for example, at a temperature of at least 400° C., can be achieved.

In the following, the design, assembly and attachment of the heating units 10, 13, 14 of the embodiment according to the invention as shown in FIG. 2 are explained in more detail, wherein first the heating unit 10, 13, 14 arranged on the inflow side is described. The heating units in this embodiment comprise, in addition to the heating spiral 10*a* and 10*b* as the heating surface and heating element 10, an attachment bolt 13 and a contact rod 14.

The contact rod 14 is arranged on the inflow end of the second gasification section. The rod 14, made of an electrically conductive material, runs perpendicular to the direction of flow 5 through two diametrically opposite bore holes in the wall of the gas line 4. The length of the contact element is measured such that the contact rod 14 protrudes out of the gas line 4 at both ends.

The attachment bolt 13, which is likewise made of an electrically conductive material, is connected to the contact rod in an electrically conductive manner. The attachment bolt 13 comprises a bolt head 24 with a bore hole passing completely through it, through which the contact rod 14 is pushed. Consequently, the bolt 13 is fixed in the direction of flow 5. In FIG. 2, the attachment bolt 13 is centrally arranged in the gas line 4. Attached to the bolt head 24 is the bolt body 25, which extends in the direction of flow 5 from the bolt head 24. The outer diameter of the bolt body 25 is smaller than the diameter of the bolt head 24.

The strip-like heating spiral 10*a*, which forms the heating surface 10*a* on the inflow side, is held centrally in the gas line 4. For this purpose, the spiral 10 is placed on the attachment bolt 13 in such a way that the attachment body 25 of the attachment bolt 13 extends through the central opening in the middle of the heating spiral 10*a*. With regard to the direction of flow 5, the side outer surface on the inflow-side of the heating spiral 10*a* abuts against the shoulder of the attachment bolt 13, which is formed by the different outer dimensions of the attachment body 25 and the attachment head 24.

In FIG. 2, the heating coil 10*a* is held in position at its inner end by the attachment bolt 13 and on its outer end by the inner wall of the gas line 4.

In order to attach the heating body 10*a*, the inner end of the heating spiral is solidly attached, i.e., in a manner that conducts current, to the attachment body 24 of the attachment bolt 13 and the outer end of the heating spiral 10*a* is solidly attached to the wall of the wall casing 4. The attachment can preferably be made by welding. However, alternative connections, such as caulking, clipping, or other suitable means of attachment can also be used for the attachment.

With reference to a plane that runs through the heating chamber 11 and perpendicular to the direction of flow 5, the heating element arranged on the outflow side is built into the gas line 4 in the mirror-image of the inflow side heating element. Accordingly, the attachment body of the heating element on the outflow-side extends from the bolt head against the direction of flow 5 to the attachment body 13 of the inflow-side heating element 10*a*. The heating spiral 10*b* is likewise centrally held by the attachment body.

When the thermal reactor 1 is operated, a power source is connected to the contact point 7 of the contact rod 14. When voltage is applied, a current flows through the contact rod 14 via the bolt head 24 and the bolt body 25, from the inner end of the heating spiral 10*a* through the heating spiral up to the outer end of the heating spiral 10*a*. The outer end of the heating spiral is electro conductively connected to earth at the inner wall of the gas line 4, effectively closing the electric circuit.

With this current flow, it is necessary to electrically insulate the contact rod 14 from the gas line 4. To this end, insulating sleeves 15, which surround the contact rod 14, are arranged in each bore hole of the gaseous substance line 4, through which parts of the contact rod 14 extend.

The insulating sleeve 15 has a sleeve body 26 and a sleeve collar 27. The sleeve body extends from the bore hole in the gas line 4 on the one side to the bolt head 24 of the attachment bolt 13 on the other side. In this way, the attachment bolt is centrally arranged in the gaseous substance line 4, because it is clamped between the two sleeve bodies 26, which diametrically close around the contact rod 14 from opposite sides.

The sleeve collar 27 lies outside of the gas line 4 and has a larger outer diameter than the sleeve body 26. In this way, the sleeve collar 27 simultaneously forms an insulating disc that lies on the outer wall of the reactor casing 4.

In order to fasten the insulating sleeves 15 and the contact rod 14 and thereby hold the attachment bolt 13 in the central position, screwed connections are provided on both sides of the contact rod.

For this purpose, each outer end of the contact rod 14 is provided with an external screw thread, onto which a washer 16 and a nut 17 are screwed, one of each at each end, which attach the heating unit comprising the contact rod 14, attachment bolt 13 and heating element 10 in the gas line 4. Naturally, instead of the screw-nut connection it is also possible to use an alternative means of attachment, such as clips, for example, in order to hold the unit in the correct position.

In order also to heat the heating chamber 11 from the radial direction, a good heat-conducting insulating layer 30, for example, a sleeve of micanite, can be used in the gasification room along the inner wall of the gas line 4. This interior insulating then represents a heat sink 30, which surrounds the heating chamber 11 in the form of a casing and radially heats the chamber 11 via the surface area of the heat sink 30. The insulating layer 30 needs to be interrupted only at one point, where the outer end of the heating spiral 10 is earthed at the housing of the gas line 4.

In order to control the temperature of the heating chamber 11, the contact rods 14 are provided with a central measurement bore hole 18 on one side. The measurement bore hole 18 extends along the longitudinal axis of the rod 14, roughly up to the middle of the rod. Consequently, a temperature probe can be inserted into the measurement bore hole 18 and used to determine the temperature at the heating surfaces 10a, 10b or in the heating chamber 11.

Figure 3:
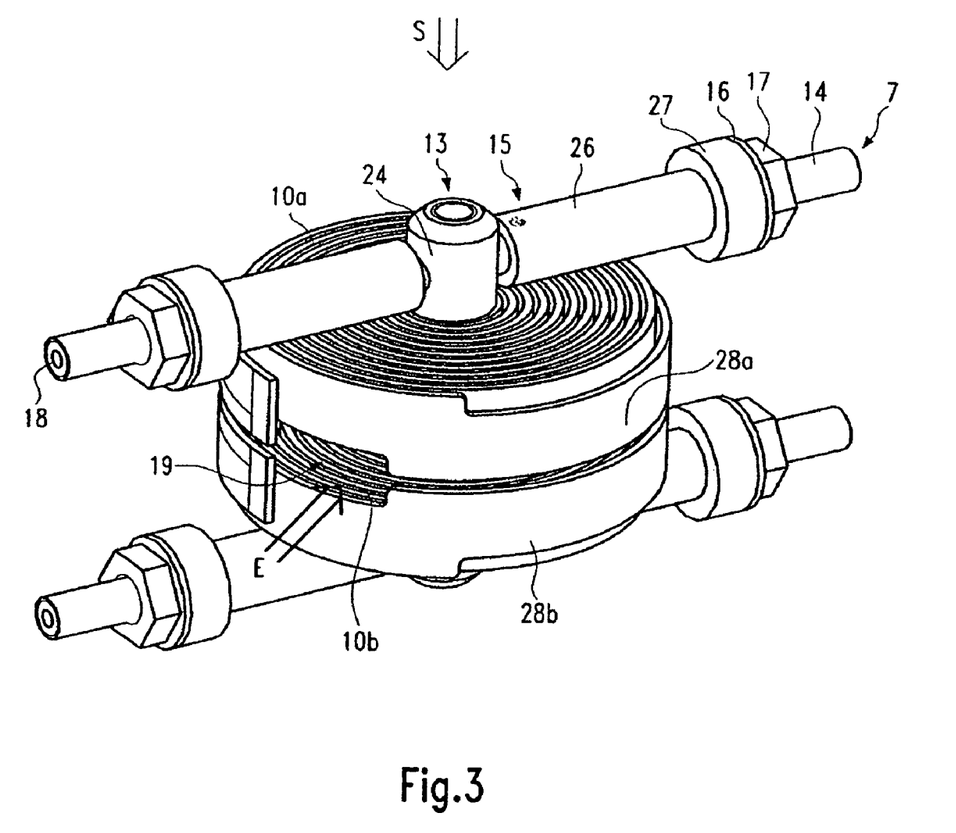
FIG. 3 a schematic depiction of the heating elements from FIGS. 1 and 2.

FIG. 3 shows a schematic view of the two heating units, which illustrates how the heating elements (10, 13, 14) are arranged in the second gasification area of the thermolysis reactor 1 (not shown in FIG. 3). For parts whose design and/or function is similar or identical to parts in the previous figures, the same reference numbers are used.

The heating units 10, 13, 14 comprise a heating surface 10a or 10b, which is simultaneously the heating element 10 of the heating unit 10, 13, 14, an attachment bolt 13, to which the heating surface 10a, 10b is attached, and a contact rod 14 for connecting the heating unit 10, 13, 14 to a power supply (not shown) and for holding the attachment bolt 13.

FIG. 3 shows the manner in which the insulating bodies 27 of the insulating sleeves 15 insulate the contact rods 14 from the heating spirals 10a and 10b. Furthermore, it is apparent that the nuts 17 on both ends of the contact rod 14 secure the insulating sleeves 15 onto the contact rod 14 and simultaneously hold the attachment bolt 13 in the middle of the rod 14. Furthermore, it can clearly be seen that the heating spirals 10a and 10b lie against the bolt head 24 of the attachment bolt 13 and are centrally held by the attachment bolt 13.

Finally, FIG. 3 shows that the outer heating spiral coil 28a and 28b of the heating spirals 10a and 10b are displaced along the axis of the direction of flow S in the direction of the heating chamber 11. In this way, the two outer heating spiral coils 28a and 28b of the heating spirals 10a and 10b form a wall, which encloses the heating chamber 11 in the radial direction. At the same time, the two outer heating spiral coils 28a and 28b may not be displaced so far that they touch.

Furthermore, it must be ensured that the outer spiral coils 28a and 28b do not completely encircle the heating spirals 10a and 10b. In this way, an inlet opening 19 remains, through which the urea pellet 12 can be fed into the heating chamber 11. The inlet opening 19 is arranged between the outer end of the heating spiral and the place at which the spiral coils 28 are displaced.

Figure 4A:
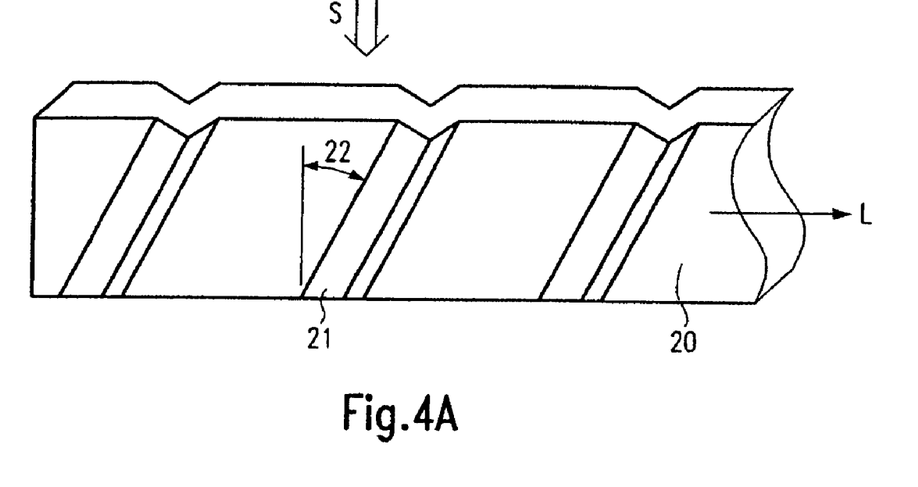
FIG. 4A a schematic depiction of an embodiment of a heating band with profiles running bevelled.
Figure 4B:
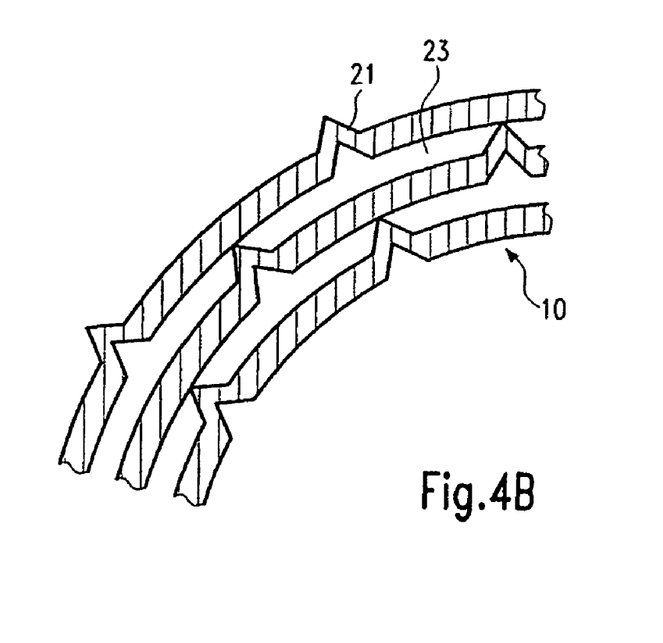
FIG. 4B the cut-out of a heating spiral with spacers fc-\>m a top view.

FIGS. 4A and 4B show schematic views of a special embodiment of the heating surfaces according to the invention. Only the differences with respect to the above-described embodiment will be explained. For parts whose design and/or function is similar or identical to parts in the previous embodiment, the same reference numbers are used as in the preceding figures.

FIG. 4A shows a heating band 20 in the uncoiled state, which can be wound up into a heating spiral 10, as shown in sections in FIG. 4B.

At regular intervals, the heating band 20 is provided with areas which protrude out of the surface of the heating band 20 as bulges. The bulging profiles 21 in FIG. 4A are stamped as triangular corrugations 21, which run across the entire width of the heating band 20. The profiles 21 do not run perpendicular to the longitudinal direction L of the heating band 20, but are instead produced tilted to the longitudinal axis L at an angle of inclination 22. In this way, the stampings 21 serve as flow elements, which deflect and swirl the exhaust gas flow, which perpendicularly meets the flat side of the heating band 20, which is indicated by the direction of flow S.

Naturally, the angle of inclination 22 of the stampings 21 can be adapted to the requirements in the thermal reactor 1.

Furthermore, the stamping 21 does not necessarily have to run lineally, but can instead take any course that is suitable to swirling the exhaust gas air.

FIG. 4B shows a schematic view of a rolled-up heating band according to FIG. 4A in sections.

This representation illustrates that the profiles 21 serve not only as current-conducting bodies, as described above, but also as spacers 21 between adjacent spiral coils of the rolled-up heating band 20. Consequently, although there is contact between loops of the heating spiral 10, the contact cannot have any negative effects because of the low potential difference in the heating spiral 10. Furthermore, the spacers also serve to determine the passage openings 23 of the rolled-up heating spiral 10. The passage opening 23 can consequently be easily defined by the thickness of the spacers 21.

Alternatively to the stampings 21, it is also possible to apply spacers to a flat heating band 20, for example, by gluing or clipping. If one uses spacers 21 of an insulating material in this case, the spacers 21 simultaneously provide insulation of the successive spiral coils of the heating spiral 10.

Figure 5:
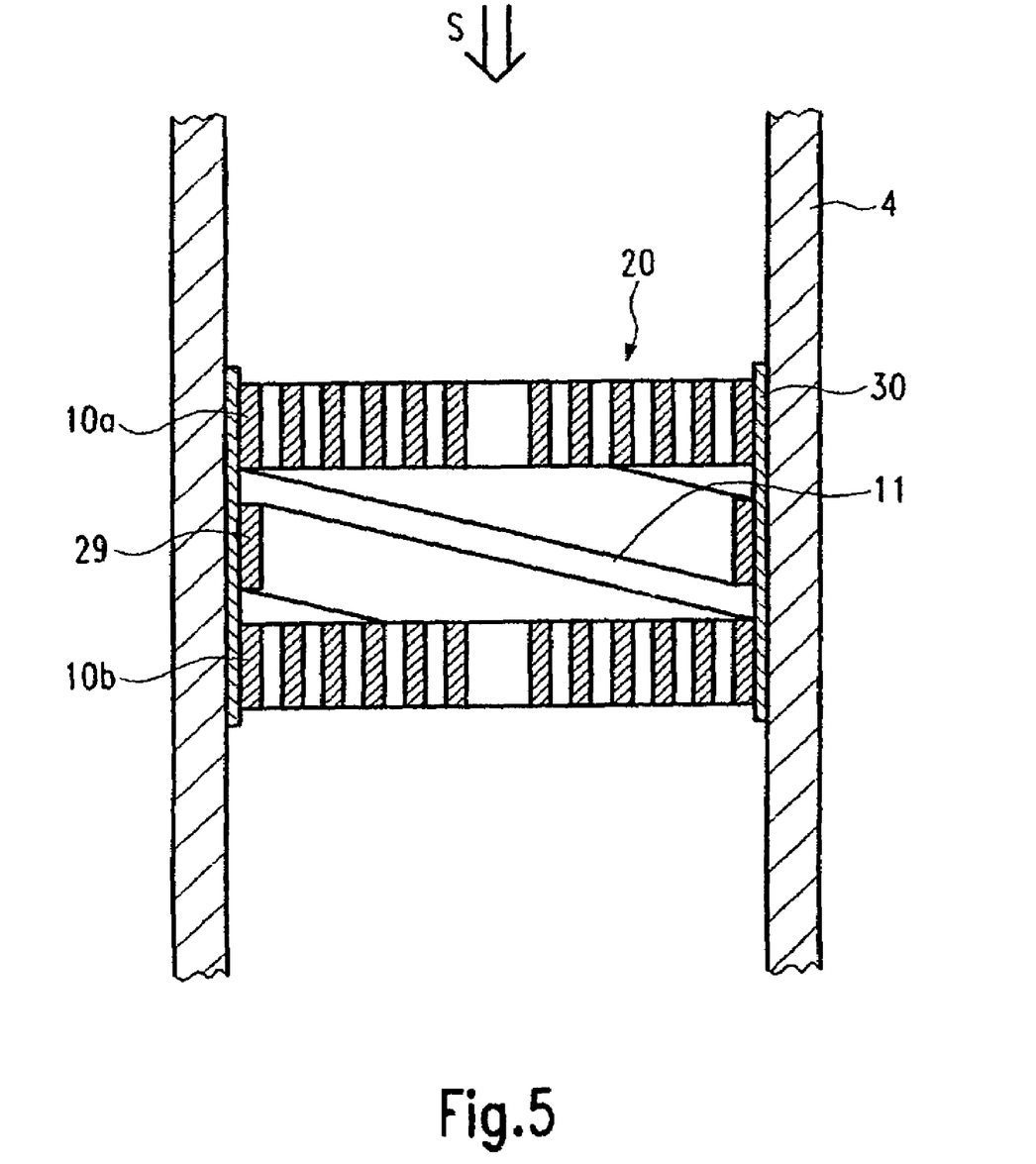
FIG. 5 a second embodiment of the heating device according to the invention.

FIG. 5 is a schematic representation of a further embodiment of the heating device according to the invention.

The contact rods 14 and the means of attachment 13 have been left out for the sake of clarity. For parts whose design and/or function is similar or identical to parts in the previous embodiments, the same reference numbers are used as in the preceding figures.

FIG. 5 shows that the two gas-permeable heating surfaces 10a and 10b, spaced from each other in the direction of flow S and defining a heating chamber 11, can be sections of a single heating band 20. The one end of the heating band 20 is first, as described above, coiled, from inside to outside, into a first flat heating surface 10a in the form of a spiral. The first heating spiral 10a extends in the direction of flow S of a flow of gas upstream of a second heating spiral 10b, which is formed from the other end of the heating band 20.

The outer end of the first heating spiral 10a, however, is not connected to earth at the wall of the gas line 4 and ended there, but instead runs in a section 29 that winds like a screw in the direction of flow S along the inner wall of the gas line 4. The length of the heating band section 29 that winds like a screw therefore determines the height of the heating chamber 11.

In order to prevent the screw-like heating band section from coming into contact with the wall of the gas line 4, an insulating layer 30 is attached to the inner wall. First, the insulating layer 30 prevents the heating band 20 from being earthed to the gas line 4 in the screw-like section 29. Second, if the insulating layer 30 is made of a heat-conducting material, the heating chamber 11 can also be heated from the radial direction via the insulating heat sink 30.

Finally, the heating band 20 ends in an outflow-side heating spiral 10b, which corresponds to the inflow-sided heating spiral 10a and is rolled up from the outside to the inside.

Figure 6:
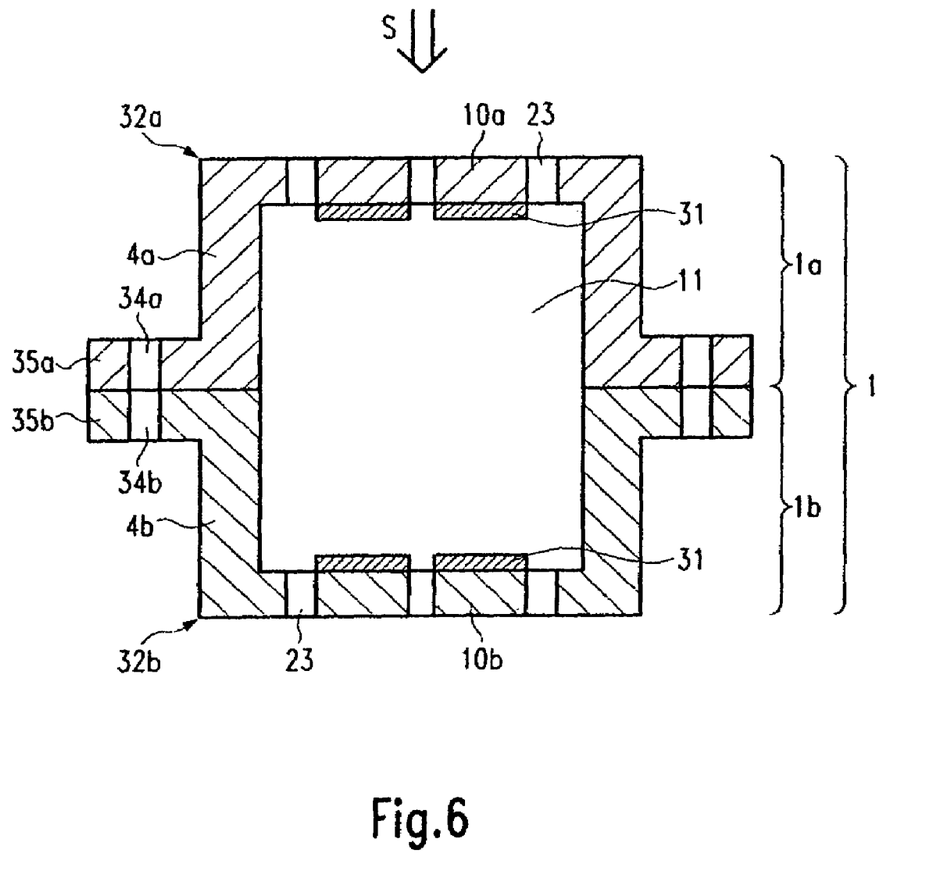
FIG. 6 a third embodiment of the heating device according to the invention.

Any heating systems can be used as heating elements, for example, thick-film heaters 31, which generate the heat emitted via the heating surfaces 10a, 10b. This is shown in FIG. 6. For parts whose design and/or function is similar or identical to parts in the previous figures, the same reference numbers are used again. Again, for the sake of clarity, the electrical contacting of the heating elements is left out.

The thermal reactor 1 in this embodiment consists of an inflow-side heating unit 1a and an outflow-side heating unit 1b, which, connected together, form the heating device or thermal reactor 1. The two heating units 1a and 1b are constructed identically, so the inflow-side heating unit 1a is described in the following.

The heating unit 1a comprises a thick-film heater 31 on a support element 32a with a heating surface 10a, a gas-conducting casing section 4a and a flange 35a. The support element 32a is essentially cylindrically formed, wherein the heating surface 10a forms the base of the cylinder and the pipe section 4a forms the cylinder jacket. The support element 32a is consequently essentially cup-shaped or barrel-shaped, wherein the heating surface 10a represents the bottom and the surface area 4a represents the wall or jacket of the cup.

Several gas-permeation openings 23 are formed in the heating surface 10a, so that a gas flow can pass through this surface in a direction of flow S. Gas cannot permeate the casing 4a, on the other hand, so that the casing 4a represents the gas line 4 of the thermal reactor 1.

The thick-film heaters 31 are mounted to the heating surface 10a in the interior of the cup-shaped support element 32a in such a way that they do not cover the gas-permeation openings 23. The heat produced by the thick-film heaters 31 is transferred to the support element 32a, or 32b, which represents a one-piece heat sink 32 with a heating surface 10a and a casing section 4a. The thick-film heaters 31 can naturally also be connected to the support element 32a at any other point in a manner that conducts heat.

The flange 35a of the support element 32a is formed in the form of a collar running around the exterior of the pipe section 4a at the end of the gas line section 4a, which lies opposite the heating surface 10a.

The outflow-side heating element 1b of the thermal reactor 1 is constructed identically to the inflow-side heating element 1. The two heating elements 1a and 1b are connected to each other at their flange zones 35a and 35b. For example, in FIG. 6, the flange zones 35a and 35b of the two heating elements 1a and 1b have mounting openings 34a and 34b that are aligned to each other and that can serve for holding a means of connection, such as screws or clips (not shown in FIG. 6).

In this way, the two heating units 1a and 1b form a thermal reactor 1 with a heating chamber 11, which is defined by the support elements 32a and 32b. The two heating surfaces 10a and 10b are spaced at a distance from one another and define the heating chamber 11 in the direction of flow S, while the two casing sections 4a and 4b of the heating units 1a and 1b form the gas line 4 of the thermal reactor 1.

The above embodiments represent only explanatory embodiments, whose features can be combined and modified as desired. For example, particularly the development of the stampings 21 of the heating band 20 that act as spacers can be varied in any way. Furthermore, a heated filament or a tubular heating element, through which a heating medium flows, can be used in place of a heating band 20. Furthermore, any other type of electric heating system, as well as a heating system on an inductive basis, can be used. An embodiment in which the heating elements 11 are formed from heating surfaces 10a, 10b made of electrically conductive ceramic is also possible.

The invention claimed is:

1. A heating device for the heating and gasification of urea or a urea solution and designed for installation in a gas line extending in a direction of flow, the heating device comprising at least two gas-permeable heating surfaces that are spaced apart from each other in the direction of flow and that define a heating chamber, and an inlet opening that discharges into the heating chamber between the at least two heating surfaces and through which the urea or the urea solution can be fed into the heating chamber.

2. Heating device according to claim 1, wherein the heating surfaces extend in a plane that runs essentially perpendicular to the direction of flow.

3. Heating device according to claim 1, wherein the heating device comprises at least two heating elements, wherein each of the heating surfaces is allocated to a separate heating element.

4. Heating device according to claim 1, wherein a heat sink is provided that surrounds the heating chamber in the form of a casing and that is in a heat transfer connection with at least one heating element.

5. Heating device according to claim 1, wherein at least one heating surface is formed by a heat sink and that the heat sink is in a heat-transfer connection with at least one heating element.

6. Heating device according to claim 4, wherein the heat sink, in one piece, forms at least one heating surface and a section of the casing of the heating chamber.

7. Heating device according to claim 1, wherein at least one of the heating surfaces is formed from a heating spiral, at least in sections.

8. Heating device according to claim 7, wherein the heating spiral comprises a rolled up heating band.

9. Heating device according to claim 1, wherein the heating surfaces have gas-permeation openings with a clearance width that is smaller than the clearance of the inlet opening.

10. Heating device according to claim 1, wherein at least one heating surface comprises a plurality of adjacent heating sections, which are held at a distance from one another by spacers and that way form the gas-flow openings.

11. Heating device according to claim 10, wherein bulged areas of profiles are formed in the heating surface as spacers.

12. Heating device according to claim 1, wherein the heating surfaces form flow elements by means of which the flow in the heating chamber can be swirled during operation.

13. Heating device according to claim 10, wherein the spacers are arranged inclined to the direction of flow as flow elements.

14. Heating device according to claim 1, wherein the device is for an internal combustion engine.

15. Thermal reactor according to claim 14, wherein the heating device at least partially forms the gas line of the thermal reactor.

16. Thermal reactor according to claim 14, wherein the thermal reactor is for an internal combustion engine.

17. Thermal reactor for the heating and gasification of urea or a urea solution comprising a heating device, an intake opening and an exhaust opening, wherein the intake opening and the exhaust opening are connected to each other by a gas line and wherein a gasification area is arranged in the gas line, wherein the heating device comprises a heating chamber arranged in the gasification area, said heating chamber being defined on the intake and exhaust sides by heating surfaces through which the gas can pass and that the heating chamber has an inlet opening for the urea or the urea solution between the heating surfaces.

18. Thermal reactor according to claim 17, wherein the heating device is according to claim 1.

19. Thermal reactor according to claim 17, wherein the gas line has a feed opening in the gasification area, said feed opening discharging into the area of the heating chamber.

20. Thermal reactor according to claim 19, wherein the feed opening discharges in the area of the inlet opening of the heating chamber.

* * * * *